United States Patent
Lee et al.

(10) Patent No.: US 8,654,274 B2
(45) Date of Patent: Feb. 18, 2014

(54) BACKLIGHT ASSEMBLY AND LIQUID CRYSTAL DISPLAY DEVICE INCLUDING THE SAME

(75) Inventors: Joo-Young Lee, Yongin (KR); Myeong-An Min, Yongin (KR); Jin-Seok Jang, Yongin (KR)

(73) Assignee: Samsung Display Co., Ltd. (KR)

( * ) Notice: Subject to any disclaimer, the term of this patent is extended or adjusted under 35 U.S.C. 154(b) by 180 days.

(21) Appl. No.: 13/213,627

(22) Filed: Aug. 19, 2011

(65) Prior Publication Data

US 2012/0169958 A1 Jul. 5, 2012

(30) Foreign Application Priority Data

Dec. 29, 2010 (KR) ........................ 10-2010-0138061

(51) Int. Cl.
*G02F 1/1333* (2006.01)
*G02F 1/1335* (2006.01)
*G09F 13/04* (2006.01)

(52) U.S. Cl.
USPC .............................. 349/58; 349/65; 362/97.2

(58) Field of Classification Search
USPC ...................... 349/58, 65; 362/97.2
See application file for complete search history.

(56) References Cited

U.S. PATENT DOCUMENTS

| 6,473,146 | B1 * | 10/2002 | Lee | 349/152 |
| 7,360,937 | B2 * | 4/2008 | Han et al. | 362/608 |
| 7,612,756 | B2 * | 11/2009 | Kim | 345/102 |
| 7,639,317 | B2 * | 12/2009 | Cho | 349/61 |
| 7,864,260 | B2 * | 1/2011 | Lee et al. | 349/58 |

FOREIGN PATENT DOCUMENTS

| CN | 101082726 | 12/2007 |
| JP | 4304204 | 7/2009 |
| KR | 1020070115263 | 12/2007 |
| KR | 100858287 | 9/2008 |
| KR | 100877868 | 10/2008 |
| KR | 1020090002117 | 1/2009 |

* cited by examiner

*Primary Examiner* — Mike Qi

(74) *Attorney, Agent, or Firm* — Knobbe Martens Olson & Bear LLP

(57) ABSTRACT

A backlight assembly is provided. The backlight assembly includes a mold frame having a tetragonal frame shape and including four side parts and a bottom part extending from bottoms of the side parts, a printed circuit board disposed on the bottom part of the mold frame, at least one light source disposed on the printed circuit board, and a light guide sheet disposed at a side of the light source and accommodated in the mold frame.

12 Claims, 4 Drawing Sheets

BACKLIGHT ASSEMBLY AND LIQUID CRYSTAL DISPLAY DEVICE INCLUDING THE SAME

CROSS-REFERENCE TO RELATED APPLICATIONS

This U.S. non-provisional patent application claims priority under 35 U.S.C. §119 of Korean Patent Application No. 10-2010-0138061, filed on Dec. 29, 2010, the entire contents of which are hereby incorporated by reference.

BACKGROUND

Field

The present disclosure relates to a backlight assembly and a liquid crystal display device including the backlight assembly, and more particularly, to a backlight assembly and a liquid crystal display device including the backlight assembly, which makes it possible to reduce the assembly tolerance of light sources.

Liquid crystal display (LCD) devices, which are used in notebooks, desktop computers, LCD-TVs, and mobile communication terminals, are passive devices having no light source therein. Thus, LCD devices use light emitted from a backlight to display an image. Such a backlight assembly is formed by sequentially stacking and fixing a light source part for providing light to a liquid crystal panel, a reflective sheet, a light guide sheet, and optical sheets on a mold frame. In recent years, light emitting diodes (LEDs) have been used as light sources of a backlight assembly for a small display device such as cellular phones.

SUMMARY OF CERTAIN INVENTIVE ASPECTS

The present disclosure provides a backlight assembly, which makes it possible to reduce the assembly tolerance of light sources.

The present disclosure also provides a liquid crystal display device including the backlight assembly that makes it possible to reduce the assembly tolerance of light sources.

Embodiments provide backlight assemblies including: a mold frame having a tetragonal frame shape and including four side parts and a bottom part extending from bottoms of the side parts; a printed circuit board disposed on the bottom part of the mold frame; at least one light source disposed on the printed circuit board; and a light guide sheet disposed at a side of the light source and accommodated in the mold frame.

In some embodiments, the light source may include a light emitting diode.

In other embodiments, the backlight assemblies may further include a reflective sheet disposed under the light guide sheet.

In still other embodiments, the backlight assemblies may further include optical sheets disposed on the light guide sheet.

In even other embodiments, the backlight assemblies may further include a bottom chassis disposed under the mold frame.

In other embodiments of the inventive concept, liquid crystal display devices including: a liquid crystal panel displaying an image; and a backlight assembly providing light to the liquid crystal panel, wherein the backlight assembly includes: a mold frame having a tetragonal frame shape and including four side parts and a bottom part extending from bottoms of the side parts; a printed circuit board disposed on the bottom part of the mold frame; at least one light source disposed on the printed circuit board; and a light guide sheet disposed at a side of the light source and accommodated in the mold frame.

In some embodiments, the light source may include a light emitting diode.

In other embodiments, the liquid crystal display devices may further include a reflective sheet disposed under the light guide sheet.

In still other embodiments, the liquid crystal display devices may further include optical sheets disposed on the light guide sheet.

In even other embodiments, the liquid crystal display devices may further include a bottom chassis disposed under the mold frame.

In yet other embodiments, an edge of the liquid crystal panel may be surrounded by a side part of the bottom chassis, and the side part of the bottom chassis may be bent and extend inward.

In further embodiments, the liquid crystal display devices may further include a top chassis disposed on the liquid crystal panel and coupled to the bottom chassis.

BRIEF DESCRIPTION OF THE DRAWINGS

The accompanying figures are included to provide a further understanding of embodiments of the inventive concept, and are incorporated in and constitute a part of this specification. The drawings illustrate embodiments of the inventive concept and, together with the description, serve to explain principles of the inventive concept. In the figures.

DETAILED DESCRIPTION OF CERTAIN INVENTIVE EMBODIMENTS

Figure 1:
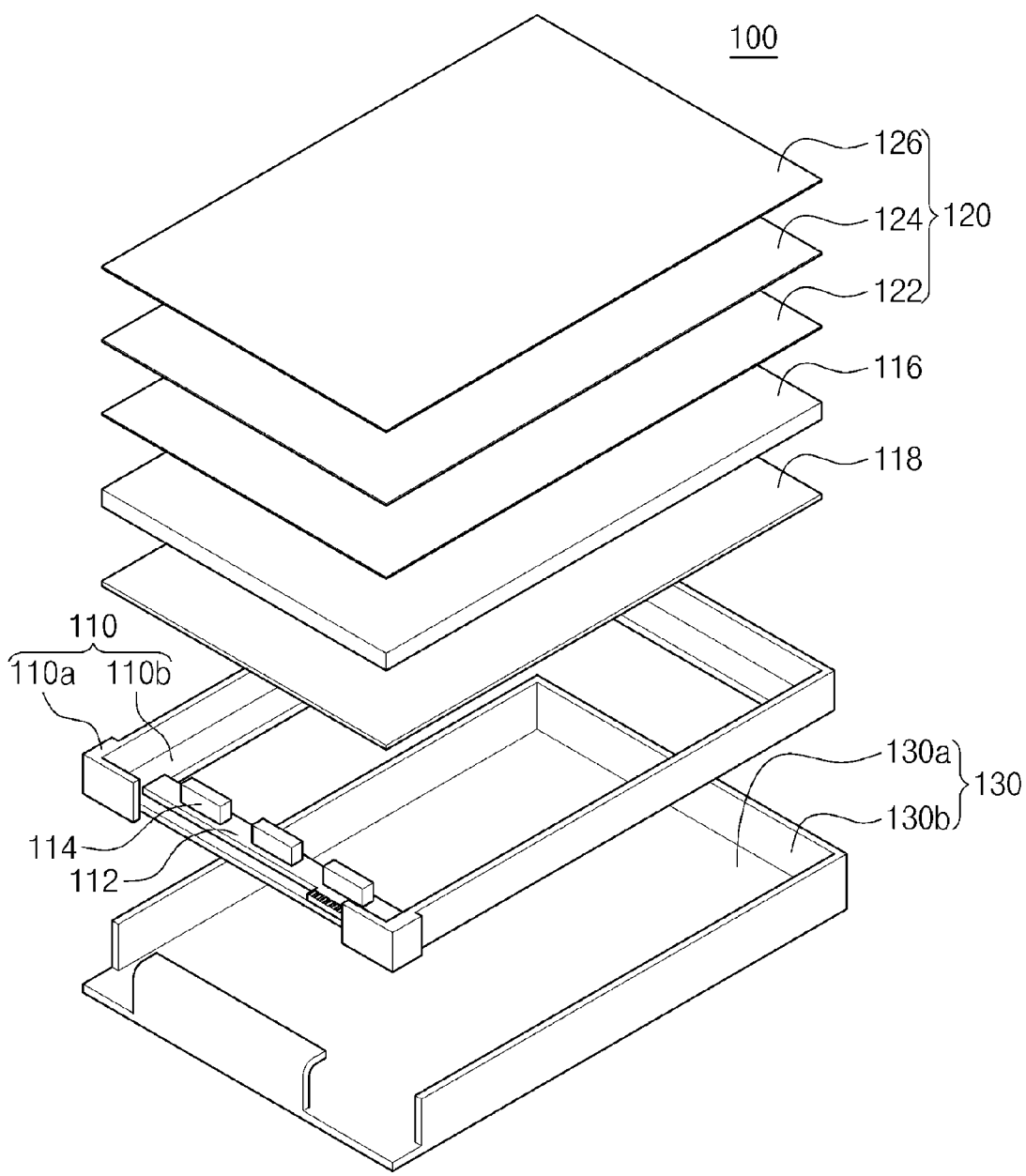
FIG. 1 is an exploded perspective view illustrating an embodiment of a backlight assembly.

Certain embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the drawings, the dimensions of elements may be exaggerated for clarity of illustration. Like reference numerals generally refer to like elements throughout.

Figure 2:
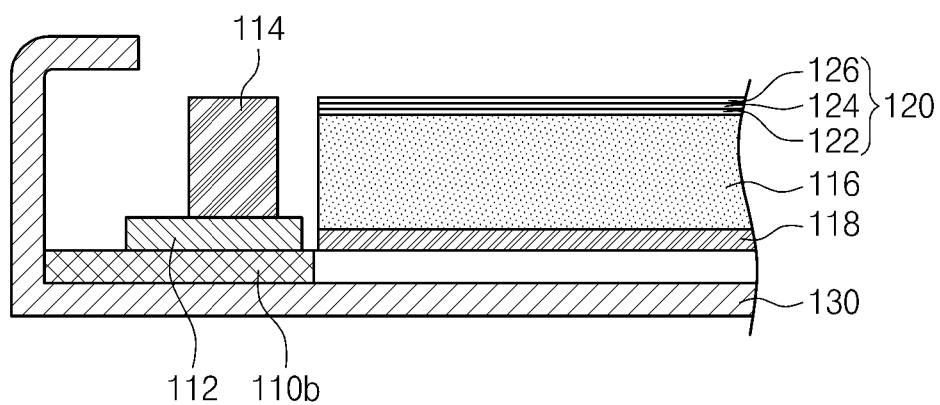
FIG. 2 is a cross-sectional view illustrating an embodiment of a backlight assembly.

FIG. 1 is an exploded perspective view illustrating an embodiment of a backlight assembly. FIG. 2 is a cross-sectional view illustrating an embodiment of a backlight assembly.

Referring to FIGS. 1 and 2, an embodiment of a backlight assembly 100 includes a mold frame 110 having an accommodation space, a printed circuit board 112 disposed on a bottom part 110b of the mold frame 110, light sources 114 accommodated in the mold frame 110, a light guide sheet 116, a reflective sheet 118, and optical sheets 120.

The mold frame 110 is tetragonal shape and may include four side parts 110a that are integrally formed, and a bottom part 110b that extends from bottoms of the side parts 110a. The side parts 110a and the bottom part 110b may provide the accommodation space. The side part 110a adjacent to the light sources 114 may be partially removed.

The bottom part 110b may have a thickness such that the level of the upper surfaces of the light sources 114 mounted on the bottom part 110b is lower or equal to that of the upper surfaces of the side parts 110a. The mold frame 110 may be formed of plastic using an injection molding method.

The printed circuit board 112 is disposed on a side of the bottom part 110b of the mold frame 110. The printed circuit board 112 is printed directly on the bottom part 110b of the mold frame 110. The printed circuit board 112 supplies driving power to the light sources 114 mounted thereon.

The light sources 114 may be mounted on the printed circuit board 112 using a surface mount technology (SMT). The light sources 114 generate light having predetermined brightness according to a driving signal of the printed circuit board 112. In some embodiments, the light sources 114 may be light emitting diodes (LED) that emit white light. The number of the light sources 114 may be one or greater according to intended brightness.

The light guide sheet 116 is disposed at a side of the light sources 114 to face light emitting surfaces of the light sources 114. The light guide sheet 116 guides paths of light emitted from the light sources 114 to uniformly transmit the light to the optical sheets 120. A point light source emitted from the light sources 114 is transformed to a surface light source by the light guide sheet 116, and the surface light source is emitted upward. The light guide sheet 116 may be formed of a transparent material to minimize the loss of light. In some embodiments, the light guide sheet 116 may be formed of polymethly methacrylate (PMMA).

Although not shown in FIGS. 1 and 2, the light guide sheet 116 may be fixed to the mold frame 110 through a single-sided or double-sided adhesive tape adhered to the edge of the light guide sheet 116 to prevent a leak of light due to loose coupling. The side parts 110a of the mold frame 110 may have recesses. In some embodiments, the light guide sheet 116 may have protrusions that are inserted in the recesses and are fixed to the mold frame 110.

The reflective sheet 118 is disposed under the light guide sheet 116. The reflective sheet 118 reflects light leaking to the lower side of the light guide sheet 116, to the light guide sheet 116, thereby improving optical efficiency.

Although not shown in FIGS. 1 and 2, the reflective sheet 118 may be fixed to the light guide sheet 116 and the mold frame 110 through adhesive tapes. The bottom part 110b of the mold frame 110 may have a recess. The reflective sheet 118 may have a protrusion that is inserted in the recess and is fixed to the mold frame 110. The reflective sheet 118 may be attached to the bottom surface of the mold frame 110 and be accommodated in a bottom chassis 130.

The optical sheets 120 are disposed over the light guide sheet 116. The optical sheets 120 may be formed by sequentially stacking a diffusion sheet 122, a prism sheet 124, and a protective sheet 126. The diffusion sheet 122 is disposed over the light guide sheet 116 to more uniformly diffuse light emitted from the light guide sheet 116. The prism sheet 124 is disposed over the diffusion sheet 122 to collect light, emitted from the diffusion sheet 122, to the front side. In some embodiments, the prism sheet 124 may include a vertical prism sheet configured to vertically collect light, and a horizontal prism sheet configured to horizontally collect light. The protective sheet 126 is disposed over the prism sheet 124 to protect the protrusions of prisms. The optical sheets 120 improve uniformity and/or brightness of light transmitted by the light guide sheet 116.

The backlight assembly 100 may further include the bottom chassis 130 under the mold frame 110. The bottom chassis 130 may include a bottom part 130a having a tetragonal frame shape, and four side parts 130b extending from the edge of the bottom part 130a. The side parts 130b of the bottom chassis 130 may be partially removed to easily couple to the mold frame 110. A portion of the side parts 130b of the bottom chassis 130 may be bent inward.

The bottom chassis 130 is fixed to the mold frame 110 to support and protect the mold frame 110, the light sources 114, the light guide sheet 116, the reflective sheet 118, and the optical sheets 120 from an external shock or vibration. The bottom chassis 130 may be formed of a metal having high strength and resistance to deformation.

Although the bottom chassis 130 is separated from the mold frame 110 in FIG. 1, the bottom chassis 130 may be integrally formed with the mold frame 110 using an insert injection molding method in other embodiments o. In such embodiments, a manufacturing process can be simplified.

As shown in FIG. 1, the printed circuit board 112 is disposed directly on the bottom part 110b of the mold frame 110, and the light sources 114 are surface-mounted on the printed circuit board 112. Thus, since an assembly tolerance of the printed circuit board 112, which may occur when the light sources 114 are mounted, is reduced, a tilt of the light sources 114 due to the assembly tolerance can be minimized, so that optical characteristics and visibility of the backlight assembly 100 can be stably ensured.

Figure 3:
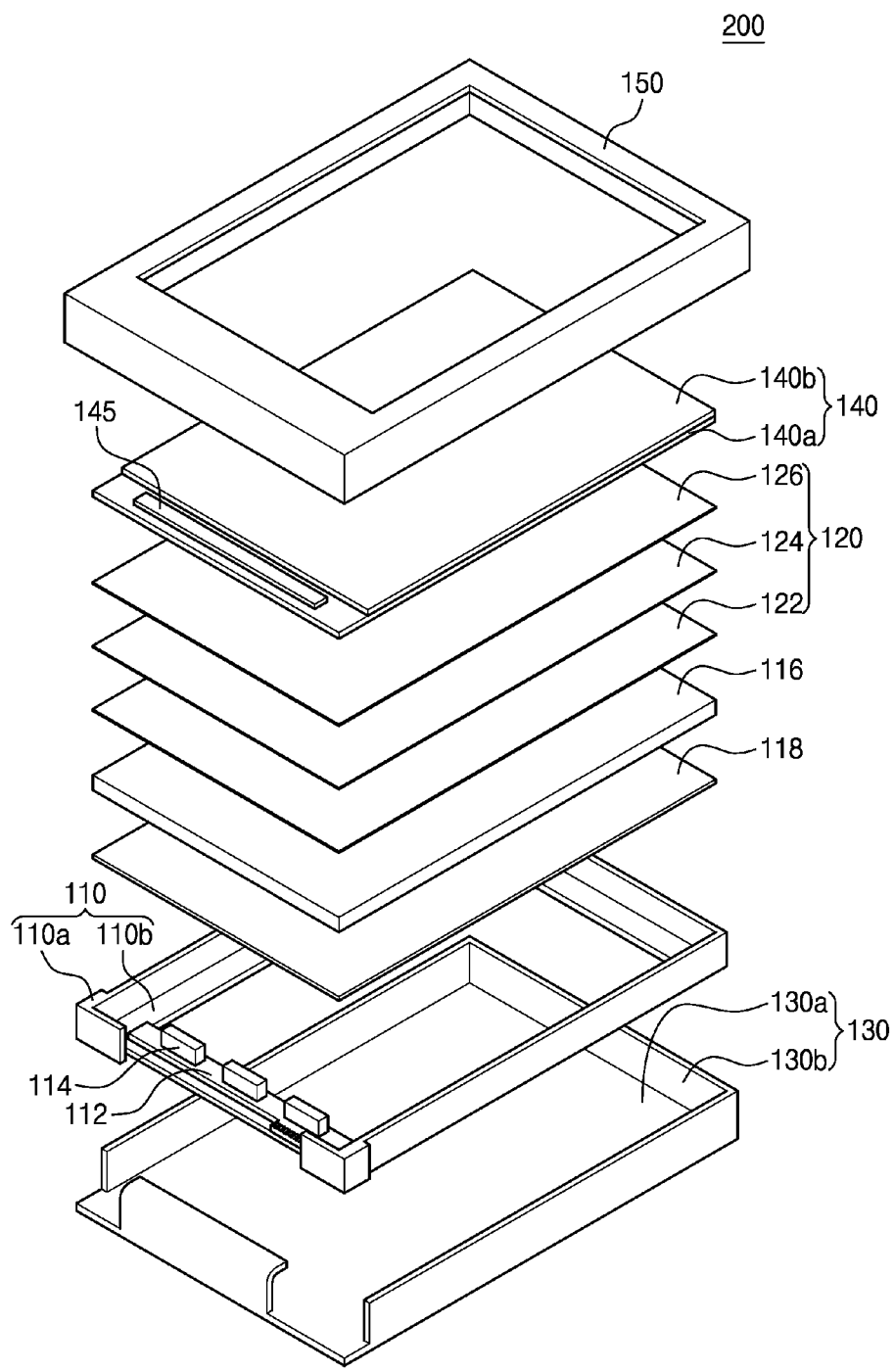
FIG. 3 is an exploded perspective view illustrating an embodiment of a liquid crystal display device.
Figure 4:
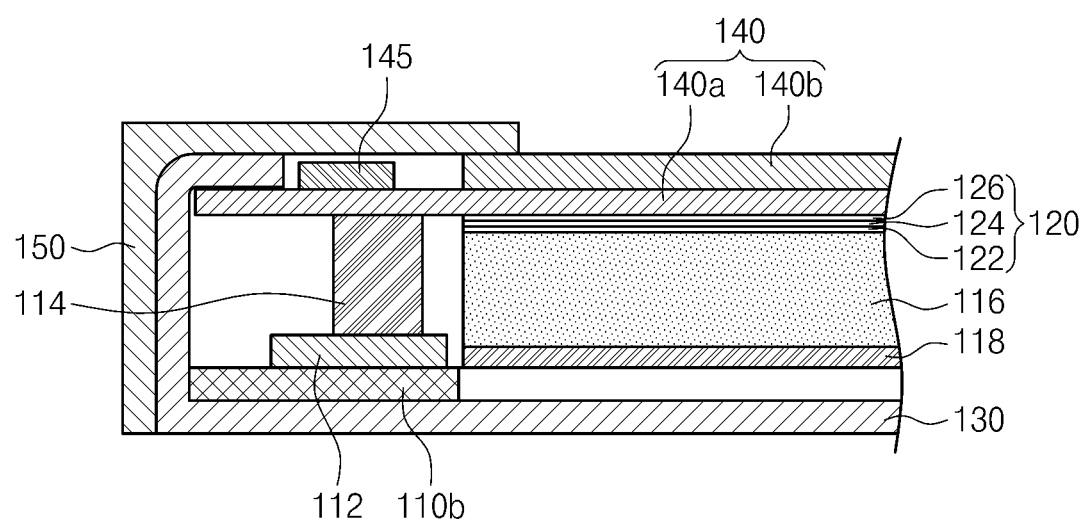
FIG. 4 is a cross-sectional view illustrating an embodiment of a liquid crystal display device.

FIG. 3 is an exploded perspective view illustrating an embodiment of a liquid crystal display device. FIG. 4 is a cross-sectional view illustrating an embodiment of a liquid crystal display device.

An embodiment of a liquid crystal display device 200 will be described with reference to FIGS. 3 and 4. The liquid crystal display device 200 may include a liquid crystal panel 140 and a top chassis 150 on the backlight assembly 100. Since embodiment of the backlight assembly 100 (refer to FIG. 1) have been described, a description thereof will be omitted here, principally, differences between the current and previous embodiments are described below.

Referring to FIGS. 3 and 4, the liquid crystal display device 200 may include the backlight assembly 100, the liquid crystal panel 140, and the top chassis 150.

The backlight assembly 100 is disposed under the liquid crystal panel 140 to provide light to the liquid crystal panel 140. The backlight assembly 100 transforms light emitted from the light sources 114 to a surface light source through the light guide sheet 116 and emits the surface light source to the liquid crystal panel 140.

The liquid crystal panel 140 is disposed over the backlight assembly 100. The liquid crystal panel 140 includes a thin film transistor (TFT) substrate 140a, a color filter substrate 140b, and a liquid crystal layer (not shown) disposed between the TFT substrate 140a and the color filter substrate 140b. The liquid crystal panel 140 displays an image using light emitted from the backlight assembly 100.

The TFT substrate 140a includes TFTs that are switching devices. Source electrodes of the TFTs are connected to data lines, and gate electrodes thereof are connected to gate lines. Drain electrodes of the TFTs are connected to pixel electrodes formed of a transparent conductive material.

The color filter substrate 140b faces the TFT substrate 140a and includes a color filter layer of red (R), green (G), and blue (B) in the form of a thin film to create a predetermined color. The color filter substrate 140b includes a common electrode formed of a transparent conductive material to face the pixel electrodes.

An edge of the liquid crystal panel 140 may be surrounded by the side part 130b of the chassis 130 that is bent and extends inward. Thus, the bottom chassis 130 accommodates, supports, and protects the liquid crystal panel 140 from an external shock or vibration.

The top chassis 150 is disposed over the liquid crystal panel 140 and is coupled to the bottom chassis 130 to prevent a separation of the liquid crystal panel 140 from the bottom chassis 130. The top chassis 150 may be formed of a metal having high strength and resistance to deformation.

The liquid crystal panel 140 may be attached to the optical sheets 120 of the backlight assembly 100 through an adhesive member. In some embodiments, the top chassis 150 may be removed.

A driving circuit chip 145 may be disposed on a side portion of the TFT substrate 140a to drive the TFT substrate 140a. The driving circuit chip 145 generates a driving signal for driving the TFT substrate 140a in response to various control signals applied from the outside. Although not shown in FIGS. 3 and 4, a printed circuit board may be disposed on a side portion of the TFT substrate 140a to apply various control signals to the liquid crystal panel 140.

When power is applied to the gate electrode of the TFT of the liquid crystal panel 140, and the TFT is turned on, an electric field is formed between the pixel electrode and the common electrode. The electric field changes molecular arrangements of liquid crystals of the liquid crystal layer disposed between the TFT substrate 140a and the color filter substrate 140b, and thus, light transmissivity of the liquid crystal layer changes to express an intended gradation.

Although not shown in FIGS. 3 and 4, first and second polarizing films may closely contact the upper and lower portions of the liquid crystal panel 140. The first polarizing film can have a first direction transmission axis to polarize light in a first direction. The second polarizing film can have a second direction transmission axis to polarize light in a second direction.

In some embodiments, since optical characteristics and visibility of the backlight assembly 100 can be stably ensured, the liquid crystal display device 200 including the backlight assembly 100 can have high visibility and high image quality.

In various embodiments, since the printed circuit board is disposed on the mold frame and the light sources are disposed thereon, a tilt of the light sources due to an assembly tolerance is minimized, and thus, the optical characteristics and visibility of the backlight assembly can be stably ensured. In addition, the liquid crystal display device including the backlight assembly can have high visibility and high image quality.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A backlight assembly comprising:
   a mold frame having a tetragonal frame shape and including four side parts and a bottom part extending from bottoms of the side parts;
   a printed circuit board printed directly on the bottom part of the mold frame;
   at least one light source disposed on the printed circuit board; and
   a light guide sheet disposed at a side of the light source and accommodated in the mold frame.

2. The backlight assembly of claim 1, wherein the light source comprises a light emitting diode.

3. The backlight assembly of claim 1, further comprising a reflective sheet disposed under the light guide sheet.

4. The backlight assembly of claim 1, further comprising optical sheets disposed on the light guide sheet.

5. The backlight assembly of claim 1, further comprising a bottom chassis disposed under the mold frame.

6. A liquid crystal display device comprising:
   a liquid crystal panel displaying an image; and
   a backlight assembly providing light to the liquid crystal panel,
   wherein the backlight assembly includes:
      a mold frame having a tetragonal frame shape and including four side parts and a bottom part extending from bottoms of the side parts;
      a printed circuit board disposed printed directly on the bottom part of the mold frame;
      at least one light source disposed on the printed circuit board; and
      a light guide sheet disposed at a side of the light source and accommodated in the mold frame.

7. The liquid crystal display device of claim 6, wherein the light source comprises a light emitting diode.

8. The liquid crystal display device of claim 6, further comprising a reflective sheet disposed under the light guide sheet.

9. The liquid crystal display device of claim 6, further comprising optical sheets disposed on the light guide sheet.

10. The liquid crystal display device of claim 6, further comprising a bottom chassis disposed under the mold frame.

11. The liquid crystal display device of claim 10, wherein an edge of the liquid crystal panel is surrounded by a side part of the bottom chassis, and the side part of the bottom chassis is bent and extends inward.

12. The liquid crystal display device of claim 10, further comprising a top chassis disposed on the liquid crystal panel and coupled to the bottom chassis.

* * * * *

UNITED STATES PATENT AND TRADEMARK OFFICE
CERTIFICATE OF CORRECTION

| | | |
|---|---|---|
| PATENT NO. | : 8,654,274 B2 | Page 1 of 1 |
| APPLICATION NO. | : 13/213627 | |
| DATED | : February 18, 2014 | |
| INVENTOR(S) | : Joo-Young Lee et al. | |

It is certified that error appears in the above-identified patent and that said Letters Patent is hereby corrected as shown below:

In the Claims

At column 6, line 32, in Claim 6, after "board" delete "disposed", therefor.

Signed and Sealed this
Ninth Day of September, 2014

Michelle K. Lee
*Deputy Director of the United States Patent and Trademark Office*